United States Patent
Campagna

(10) Patent No.: US 9,016,348 B2
(45) Date of Patent: Apr. 28, 2015

(54) SPRING-LOADED ROLLER SHADE GUDGEON

(71) Applicant: Creston Electronics, Inc., Rockleigh, NJ (US)

(72) Inventor: Michael Campagna, Woodcliff Lake, NJ (US)

(73) Assignee: Creston Electronics Inc., Rockleigh, NJ (US)

( * ) Notice: Subject to any disclaimer, the term of this patent is extended or adjusted under 35 U.S.C. 154(b) by 165 days.

(21) Appl. No.: 13/963,600

(22) Filed: Aug. 9, 2013

(65) Prior Publication Data

US 2015/0041077 A1   Feb. 12, 2015

(51) Int. Cl.
*E06B 9/50*   (2006.01)
*E06B 9/44*   (2006.01)
*F16C 41/00*  (2006.01)

(52) U.S. Cl.
CPC . *E06B 9/44* (2013.01); *F16C 41/00* (2013.01); *E06B 9/50* (2013.01)

(58) Field of Classification Search
USPC ......... 160/326, 323.1, 325, 903; 248/26, 267, 248/268; 296/97.8, 37.16
IPC .............................. E06B 9/50,9/44; F16C 41/00
See application file for complete search history.

(56) References Cited

U.S. PATENT DOCUMENTS

| | | | | |
|---|---|---|---|---|
| 1,090,931 A | * | 3/1914 | McLean | 160/313 |
| 1,688,563 A | * | 10/1928 | Tomlinson | 160/301 |
| 1,882,592 A | * | 10/1932 | Hendrickson | 160/326 |
| 1,920,099 A | * | 7/1933 | Moricca | 160/313 |
| 3,099,916 A | * | 8/1963 | Rosenbaum | 160/323.1 |
| 3,853,170 A | * | 12/1974 | Barettella | 160/323.1 |
| 4,009,745 A | * | 3/1977 | Erpenbeck | 160/297 |
| 4,399,857 A | * | 8/1983 | Honma | 160/323.1 |
| 5,464,052 A | * | 11/1995 | Wieczorek et al. | 160/23.1 |
| 5,934,354 A | * | 8/1999 | Price et al. | 160/370.22 |
| 2010/0200179 A1 | * | 8/2010 | Di Stefano | 160/368.1 |
| 2011/0315327 A1 | * | 12/2011 | Lin | 160/305 |
| 2012/0067530 A1 | * | 3/2012 | Barnes et al. | 160/326 |

* cited by examiner

*Primary Examiner* — David Purol
(74) *Attorney, Agent, or Firm* — Creston Electronics Inc.

(57) ABSTRACT

Presented is a gudgeon assembly that includes a gudgeon body, a first ball bearing, a second ball bearing, a gudgeon pin, a first spring plate, a second spring plate, and two springs. The gudgeon pin extends through the gudgeon body and is coaxial with the first and second ball bearings. The first spring plate is coupled to a distal portion of the gudgeon pin. The second spring plate defines an opening and is coupled to the second ball bearing. The opening is coaxial with the second ball bearing and the gudgeon pin. The two springs are coupled to the first spring plate and the second spring plate. Longitudinal axes of the two springs are coplanar and non-coaxial with the longitudinal axis of the gudgeon pin. The gudgeon pin, the first spring plate, and the second spring plate rotate together as a single unit and rotate independently of the gudgeon body.

22 Claims, 15 Drawing Sheets

SPRING-LOADED ROLLER SHADE GUDGEON

BACKGROUND OF THE INVENTION

1. Technical Field

The present invention generally relates to spring-loaded gudgeons for roller shades, and more particularly to a spring-loaded gudgeon configured to eliminate noise normally produced by a gudgeon pin rubbing against a gudgeon pin spring.

2. Background Art

A typical spring-loaded gudgeon assembly for a roller shade includes a gudgeon pin that is pushed longitudinally out of the gudgeon assembly by a gudgeon spring. The gudgeon pin is partially disposed inside the gudgeon assembly and the gudgeon spring is disposed inside the gudgeon assembly, behind, and coaxial with, the gudgeon pin. An end portion of the gudgeon spring contacts an end surface of the gudgeon pin. When a roller tube with such a gudgeon assembly is mounted over a window, the end of the gudgeon pin that extends out of the gudgeon assembly is coupled to a gudgeon pin plate.

A common problem with this configuration is that when the roller tube rotates (i.e., when the shade is raised or lowered), the gudgeon pin and/or the gudgeon spring also rotate, which causes the end of the gudgeon spring contacting the end of the gudgeon pin to rub/grind against the end of the gudgeon pin and make undesirable noise.

SUMMARY OF THE INVENTION

It is to be understood that both the general and detailed descriptions that follow are exemplary and explanatory only and are not restrictive of the invention.

DISCLOSURE OF THE INVENTION

According to one aspect, the invention involves a roller shade gudgeon assembly that includes a gudgeon body and a gudgeon pin coaxial with and extending through the gudgeon body. The gudgeon pin is movable along and rotationally about its longitudinal axis. The gudgeon assembly further includes a first spring plate coupled to an end of the gudgeon pin and a second spring plate that defines an opening. The opening is coaxial with the gudgeon pin. The gudgeon pin is partially disposed in the opening and movable along its longitudinal axis within the opening. The gudgeon assembly further includes a gudgeon spring coupled to the first spring plate and the second spring plate. A longitudinal axis of the gudgeon spring is coplanar and non-coaxial with the longitudinal axis of the gudgeon pin. The gudgeon spring pulls the first spring plate toward the second spring plate.

In one embodiment, the gudgeon body defines a cylindrical passage, a first cavity, and a second cavity. In another embodiment, the gudgeon assembly further includes a first ball bearing disposed in the first cavity and a second ball bearing disposed in the second cavity. In still another embodiment, the gudgeon pin defines a channel. In yet another embodiment and the second ball bearing includes an inner race and an outer race. The second spring plate is coupled to the inner race and the gudgeon body is coupled to the outer race, which allows the second spring plate and gudgeon body to rotate independently of each other. In another embodiment, the first spring plate further includes a first tab. The first tab is at least partially disposed in the channel and thereby prevents rotational movement of the gudgeon pin and first spring plate relative to each other. In still another embodiment, the second spring plate includes a second tab. The second tab is at least partially disposed in the channel and thereby aligns the second spring plate and the first spring plate and prevents rotational movement of the gudgeon pin and the first spring plate relative to the second spring plate. In yet another embodiment, the gudgeon assembly further includes a first clip coupled to the a proximal portion of the gudgeon pin. The first clip limits movement of the proximal portion into the cylindrical passage. In still another embodiment, the gudgeon assembly further includes a second clip coupled to a distal portion of the gudgeon pin. The second clip limits movement of the distal portion into the cylindrical passage.

According to another aspect, the invention involves a gudgeon assembly for use with a roller shade roller tube. The gudgeon assembly includes a gudgeon body that defines a cylindrical passage, a first cavity, and a second cavity. The gudgeon assembly further includes a first ball bearing disposed in the first cavity, a second ball bearing disposed in the second cavity, and a gudgeon pin that includes a proximal portion and a distal portion. The gudgeon pin is partially disposed in the cylindrical passage and extends through the gudgeon body. The gudgeon pin is coaxial with the first ball bearing and the second ball bearing. The gudgeon assembly further includes a first spring plate coupled to the distal portion of the gudgeon pin, and a second spring plate that defines an opening and is coupled to the second ball bearing. The opening is coaxial with the second ball bearing and the gudgeon pin. The gudgeon pin is partially disposed in the opening and movable along its longitudinal axis within the cylindrical passage and the opening. The gudgeon assembly further includes a first gudgeon spring coupled to the first spring plate and the second spring plate. A longitudinal axis of the first gudgeon spring is coplanar and non-coaxial with a longitudinal axis of the gudgeon pin. The gudgeon assembly further includes a second gudgeon spring coupled to the first spring plate and the second spring plate. A longitudinal axis of the second gudgeon spring is coplanar and non-coaxial with the longitudinal axis of the gudgeon pin and the longitudinal axis of the first gudgeon spring. The first and second gudgeon springs pull the first gudgeon plate toward the second gudgeon plate.

In one embodiment, the gudgeon assembly further includes a first clip coupled to the proximal portion of the gudgeon pin. The first clip limits movement of the proximal portion into the cylindrical passage. In another embodiment, the gudgeon assembly further includes a second clip coupled to the distal portion of the gudgeon pin. The second clip limits movement of the distal portion into the cylindrical passage. In still another embodiment, the gudgeon pin defines a channel. In yet another embodiment, the second ball bearing includes an inner race, an outer race, and a plurality of balls disposed between the inner race and outer race. The second spring plate is coupled to the inner race and the gudgeon body is coupled to the outer race which allows the second spring plate and gudgeon body to rotate independently of each other. In still another embodiment, the first spring plate further includes a first tab. The first tab is at least partially disposed in the channel and thereby prevents rotational movement of the gudgeon pin and first spring plate relative to each other. In yet another embodiment, the second spring plate includes a second tab. The second tab is at least partially disposed in the channel and thereby aligns the second spring plate and the first spring plate and prevents rotational movement of the gudgeon pin and the first spring plate relative to the second spring plate.

According to still another aspect, the invention involves a roller shade. The roller shade includes a roller tube and a gudgeon assembly partially disposed in the roller tube. The gudgeon assembly includes a gudgeon body that defines a cylindrical passage, a first cavity, and a second cavity. The gudgeon assembly further includes a first ball bearing disposed in the first cavity, a second ball bearing disposed in the second cavity, and a gudgeon pin that defines a channel and includes a proximal portion and a distal portion. The gudgeon pin is partially disposed in the cylindrical passage and extends through the gudgeon body. The gudgeon pin is coaxial with the first ball bearing and the second ball bearing. The gudgeon assembly further includes a first spring plate coupled to the distal portion of the gudgeon pin and a second spring plate that defines an opening and is coupled to the second ball bearing. The opening is coaxial with the second ball bearing and the gudgeon pin. The gudgeon pin is partially disposed in the opening and movable along its longitudinal axis within the cylindrical passage and the opening. The gudgeon assembly further includes a first gudgeon spring coupled to the first spring plate and the second spring plate. A longitudinal axis of the first gudgeon spring is coplanar and non-coaxial with a longitudinal axis of the gudgeon pin. The gudgeon assembly further includes a second gudgeon spring coupled to the first spring plate and the second spring plate. A longitudinal axis of the second gudgeon spring is coplanar and non-coaxial with the longitudinal axis of the gudgeon pin and the longitudinal axis of the first gudgeon spring. The first and second gudgeon springs pull the first gudgeon plate toward the second gudgeon plate.

In one embodiment, the second ball bearing includes an inner race, an outer race, and a plurality of balls disposed between the inner race and outer race. The second spring plate is coupled to the inner race and the gudgeon body is coupled to the outer race, which allows the second spring plate and gudgeon body to rotate independently of each other. In another embodiment, the first spring plate further includes a first tab. The first tab is at least partially disposed in the channel and thereby prevents rotational movement of the gudgeon pin and first spring plate relative to each other. In still another embodiment, the second spring plate includes a second tab. The second tab is at least partially disposed in the channel and thereby prevents rotational movement of the gudgeon pin and the first spring plate relative to the second spring plate. In yet another embodiment, a first clip is coupled to the proximal portion of the gudgeon pin. The first clip limits movement of the proximal portion into the cylindrical passage. In still another embodiment, a second clip is coupled to the distal portion of the gudgeon pin. The second clip limits movement of the distal portion into the cylindrical passage.

BRIEF DESCRIPTION OF DRAWINGS

The accompanying figures further illustrate the present invention. Exemplary embodiments are illustrated in reference figures of the drawings. It is intended that the embodiments and figures disclosed herein are to be considered to illustrative rather than limiting.

The components in the drawings are not necessarily drawn to scale, emphasis instead being placed upon clearly illustrating the principles of the present invention. In the drawings, like reference numerals designate corresponding parts throughout the several views.

LIST OF REFERENCE NUMBERS FOR THE MAJOR ELEMENTS IN THE DRAWING

Figure 1:
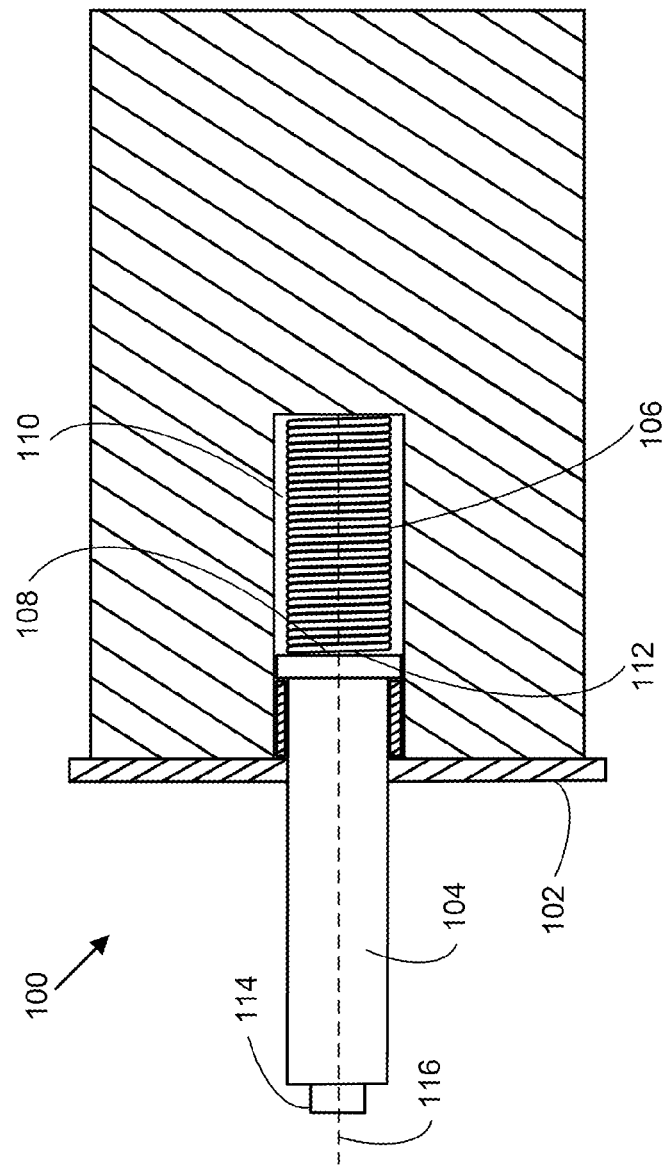
FIG. 1 is an illustrative cross-sectional side view of a prior art gudgeon assembly.
Figure 2:
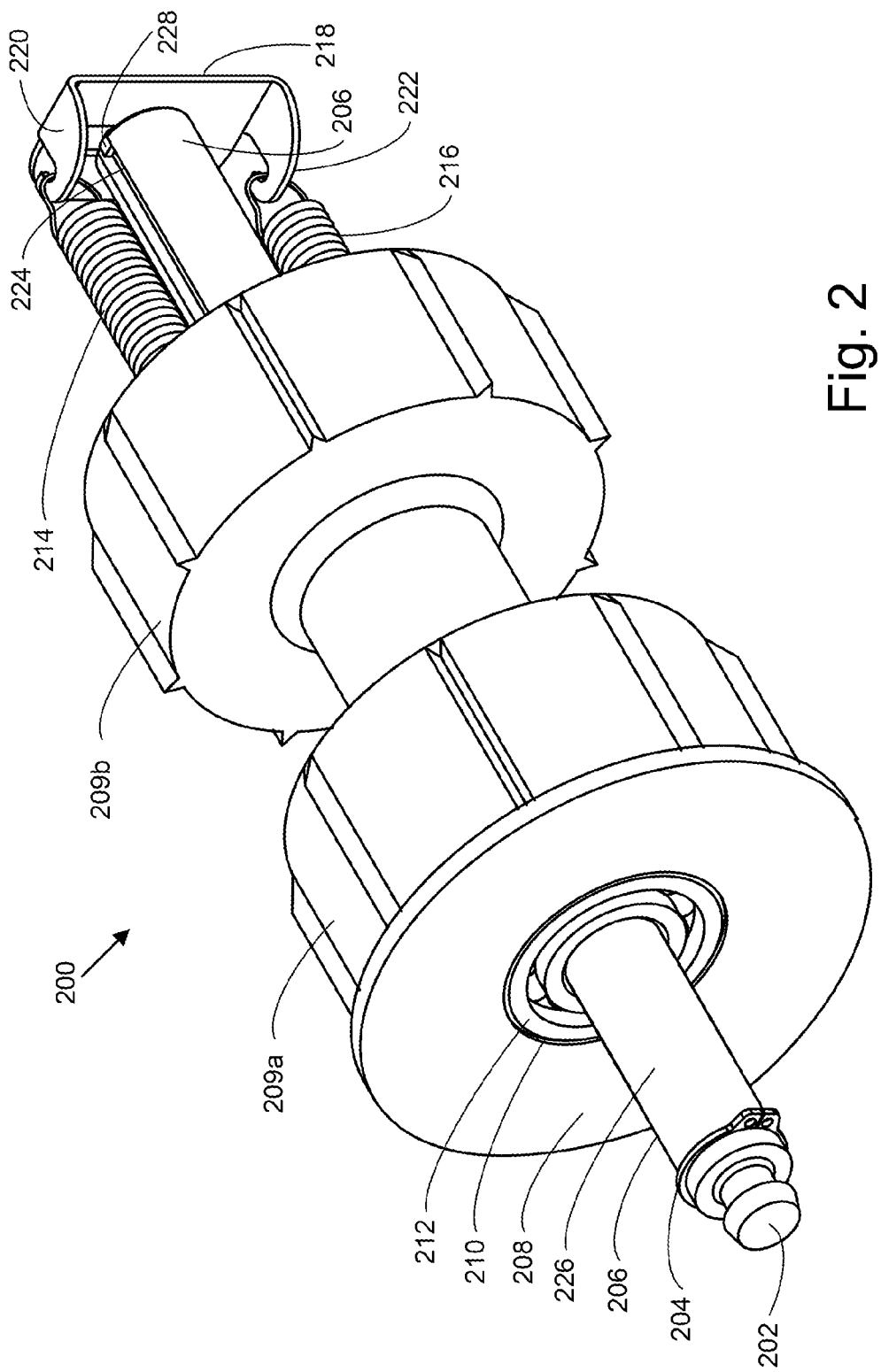
FIG. 2 is an illustrative isometric front view of a gudgeon assembly with gudgeon springs in a relaxed state, according to one embodiment of the invention.
Figure 3:
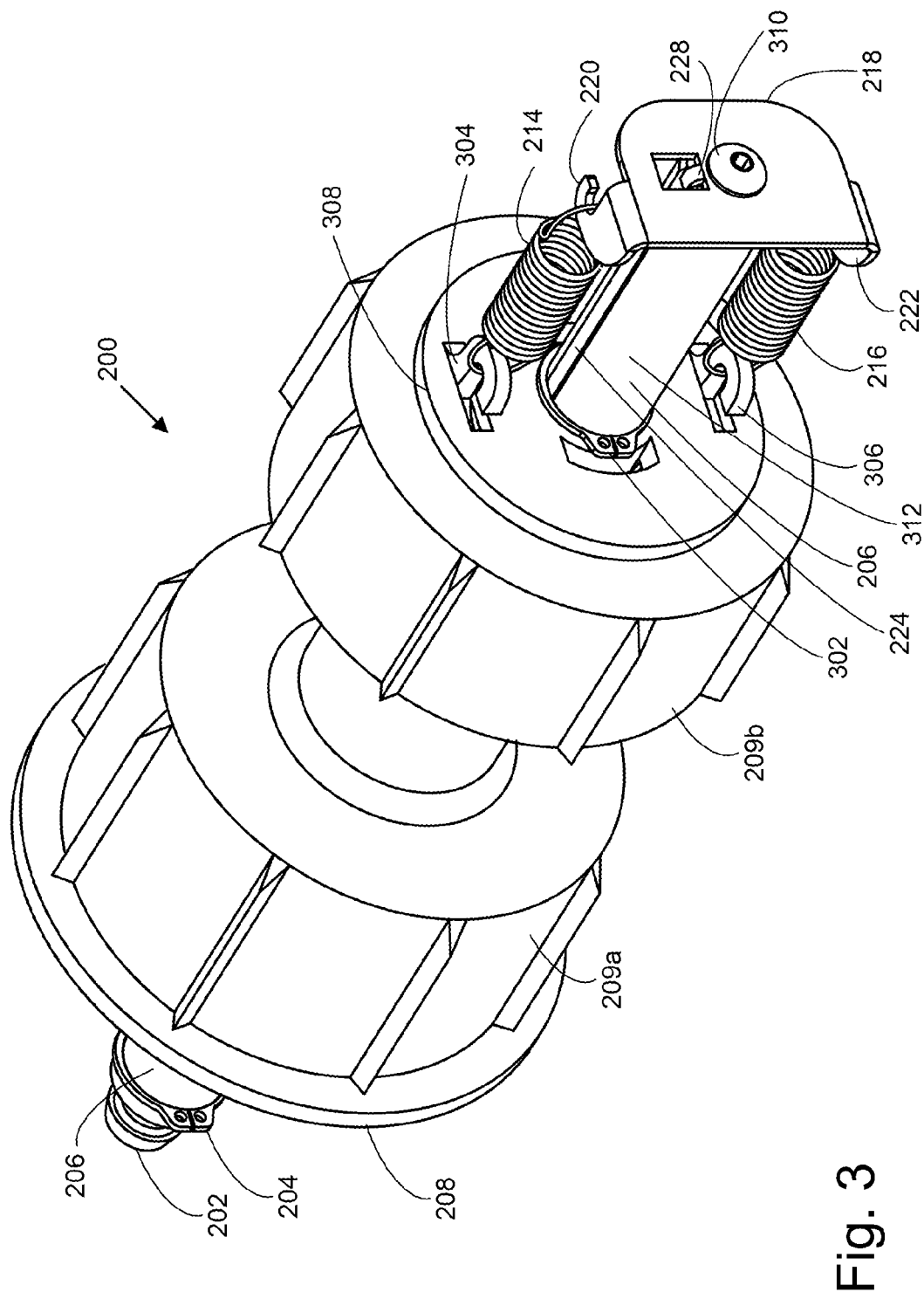
FIG. 3 is an illustrative isometric rear view of a gudgeon assembly with gudgeon springs in a relaxed state, according to one embodiment of the invention.

The following is a list of the major elements in the drawings in numerical order.

100 prior art gudgeon assembly
102 gudgeon body
104 gudgeon pin
106 gudgeon spring
108 gudgeon pin end surface
110 cavity
112 end portion
114 gudgeon pin tip
116 longitudinal axis
200 gudgeon assembly
202 gudgeon pin tip
204 first movement limit clip
206 gudgeon pin
208 gudgeon body
209a roller tube contact member
209b roller tube contact member
210 small ball bearing cavity
212 small ball bearing
214 first extension spring
216 second extension spring
218 first spring plate 220 spring hook
222 spring hook
224 tab channel
226 proximal portion
228 first alignment tab
302 second movement limit clip
304 spring hook
306 spring hook
308 second spring plate
310 spring plate screw
312 distal portion
402 flange
404 roller tube
406 inside surface
502 first movement limit clip channel
504 second movement limit clip channel
506 threaded screw hole
508 large ball bearing cavity
510 large ball bearing
512 second alignment tab
514 screw hole
516 gudgeon pin pass through opening
518 tab channel opening
602 retention member
604 cylindrical passage
606 retention member
610 opening
612 surface
614 flange
616 flange
618 opening
702 outer race
704 ball
706 inner race
708 outer race
710 ball
712 inner race
1102 gudgeon pin plate
1104 mounting hole
1106 narrow locking channek

DETAILED DESCRIPTION OF THE INVENTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

MODE(S) FOR CARRYING OUT THE INVENTION

Disclosed is a spring-loaded shade gudgeon assembly that is configured to eliminate noise produced by a gudgeon pin rubbing against a gudgeon pin spring when the roller shade is raised or lowered. Specifically, the gudgeon assembly includes a spring-loaded gudgeon pin that is separated from a gudgeon spring through the use of ball bearings.

Referring to FIG. 1, a prior art gudgeon pin assembly 100 is shown. The prior art gudgeon pin assembly 100 includes a gudgeon body 102, a gudgeon pin 104 with a tip 114, and a gudgeon spring 106. The entire gudgeon spring 106 and part of the gudgeon pin are coaxially disposed in a cavity 110 in the gudgeon body 102. The gudgeon body 102 is dimensioned to be at least partially disposed in a roller shade roller tube.

During shade installation of the roller shade, the gudgeon pin 104 is pushed into the gudgeon body 102 (along longitudinal axis 116) compressing the spring 106 (also along longitudinal axis 116). After the tip of the gudgeon pin is aligned with a mounting bracket, the gudgeon pin 104 is released and the spring 106 pushes the gudgeon pin 104 into the mounting bracket.

Thereafter, as the roller shade is rolled and unrolled, the roller tube and the gudgeon body at least partially disposed therein rotate about the axis 116. During this rotation, the gudgeon pin 104 may not rotate or may only partially rotate. Consequently, an end portion 112 of the gudgeon spring 106 rubs/grinds against gudgeon pin end surface 108 and makes undesirable noise.

Referring to FIGS. 2-6B, various views of a gudgeon assembly 200 that eliminates the above-described problems of prior art gudgeon assemblies are shown. The assembly 200 includes a gudgeon body 208, a gudgeon pin 206, a first extension spring 214, a second extension spring 216, a small ball bearing 212 (with opening 618), a large ball bearing 510 (with opening 610), a first spring plate 218, a second spring plate 308, a first movement limit clip 204, and a second movement limit clip 302.

The gudgeon pin 206 includes a proximal portion 226, a distal portion 312, gudgeon pin tip 202 disposed on the proximal portion 226, a first movement limit clip channel 502 disposed on the proximal portion 226, and a second movement limit clip channel 504 disposed on the distal portion 312. The gudgeon pin 206 also defines a tab channel 224 with a tab channel opening 518, and a threaded screw hole 506 dimensioned and arranged to receive a screw 310. In various embodiments, the gudgeon pin 206 comprises aluminum, stainless steel, or other material known to those skilled in the art.

The gudgeon body 208 includes roller tube contact members 209a, 209b (e.g., crush ribs) and a flange 402. The roller tube contact members 209a, 209b form a friction fit with an inside surface 406 of a roller tube 404, while the flange 402 prevents the gudgeon assembly 200 from sliding entirely into the roller tube 404 (see FIG. 4B). The gudgeon body 208 defines a small ball bearing cavity 210, a large ball bearing cavity 508, and a cylindrical passage 604. In various embodiments, the gudgeon body 208 comprises aluminum, stainless steel, plastic, fiberglass, or other material known to those skilled in the art.

The first spring plate 218 includes spring hook 220, spring hook 222, and a first alignment tab 228. The first spring plate 218 defines an unthreaded screw hole 514. The second spring plate 308 includes spring hook 304, spring hook 306, a second alignment tab 512, a retention member 602 having a flange 614, and a retention member 606 having a flange 616 (see FIG. 6B). The second spring plate 308 defines a gudgeon pin pass through opening 516. In various embodiments, the first spring plate 218 and the second spring plate 308 each comprise aluminum, stainless steel, plastic, fiberglass, or other material known to those skilled in the art.

In various embodiments, the ball bearings 212, 510 each comprise aluminum or stainless steel; the movement limit clips 204, 302 each comprise aluminum, stainless steel, plastic, or fiberglass; and the springs 214, 216 each comprise aluminum or stainless steel.

Still referring to FIGS. 2-6B, the gudgeon assembly 200 is constructed by inserting retention member 602 and retention member 606 into the opening 610 of the large ball bearing 510. The large ball bearing 510 is then inserted into the cavity 508 and the small ball bearing is inserted into cavity 210. Next, the gudgeon pin 206 is inserted through the opening 618, the cylindrical passage 604, and the opening 610 (see FIG. 4A).

The gudgeon pin 206 is oriented/rotated so that the tab channel opening 518 is aligned with the tab 512. As the gudgeon pin 206 is pushed through the gudgeon pin pass through opening 516, the second alignment tab 512 slides through the tab channel opening 518 into the tab channel 224 (e.g., see FIG. 9). At this stage, the gudgeon pin 206 is coaxial with the second spring plate 308 and the gudgeon body 208, and is partially disposed in the cylindrical passage 604 with the proximal portion 226 and distal portion 312 extending out of opposite ends of the gudgeon body 208, with the gudgeon pin 206 contacting the inner race 712 of the small ball bearing 212 (see FIG. 7B) and the retention members 602 and 606.

The first movement limit clip 204 is coupled to the first movement limit clip channel 502 and the second movement limit clip 302 is coupled to the second movement limit clip channel 504. The first movement limit clip 204 and the second movement limit clip 312 prevent the proximal portion 226 and the distal portion 312, respectively, from sliding entirely into the cylindrical passage 604.

Next, the first spring plate 218 is attached to the gudgeon pin 206 using screw 310 disposed through screw hole 514 and screwed into threaded screw hole 506. The first alignment tab 228 is at least partially disposed in the channel 224 and aligns the first spring plate 228 with the second spring plate 308. More specifically, spring hook 220 is aligned with spring hook 304 and spring hook 222 is aligned with spring hook 306. Additionally, the first alignment tab 228 and the second alignment tab 512 being disposed in the channel 224 together prevent the first spring plate 218, the second spring plate 308, and the gudgeon pin 206 from rotating with respect to each other. In other words, the first spring plate 218, the second spring plate 308, and the gudgeon pin 206 rotate together as a single unit independent of the gudgeon body 208, and is discussed in further detail below.

Finally, the first extension spring 214 is coupled to spring hook 304 and spring hook 220, and the second extension spring 216 is coupled to spring hook 306 and spring hook 222.

Figure 6A:
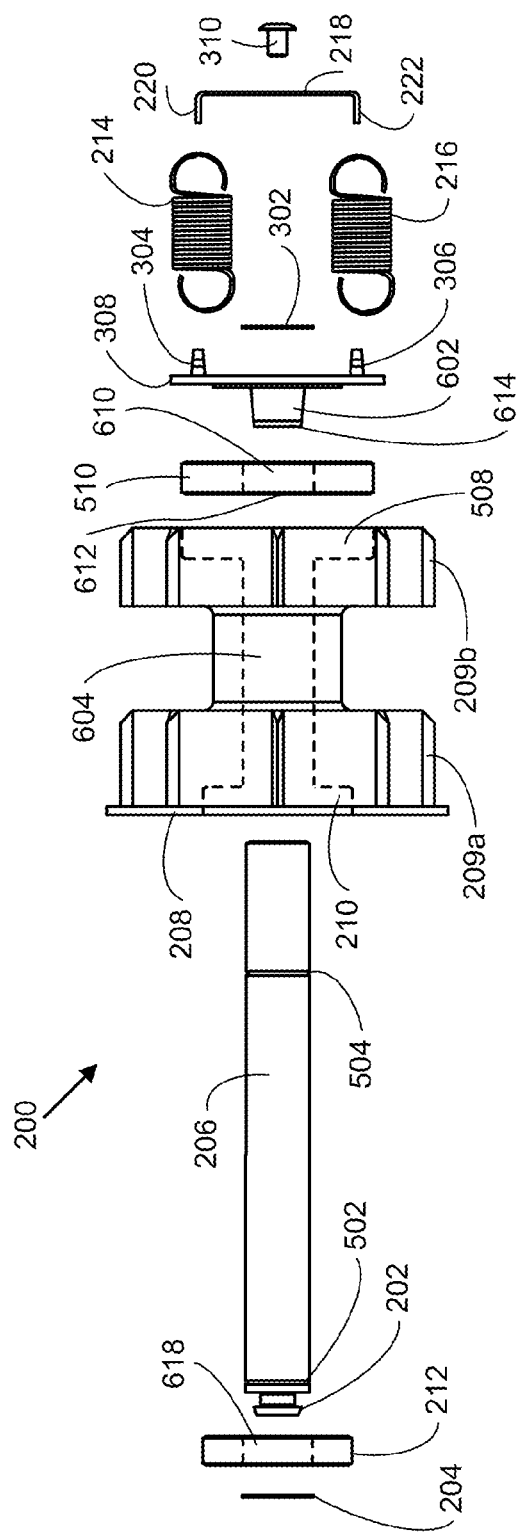
FIG. 6A is an illustrative exploded orthographic side view of a gudgeon assembly, according to one embodiment of the invention.
Figure 6B:
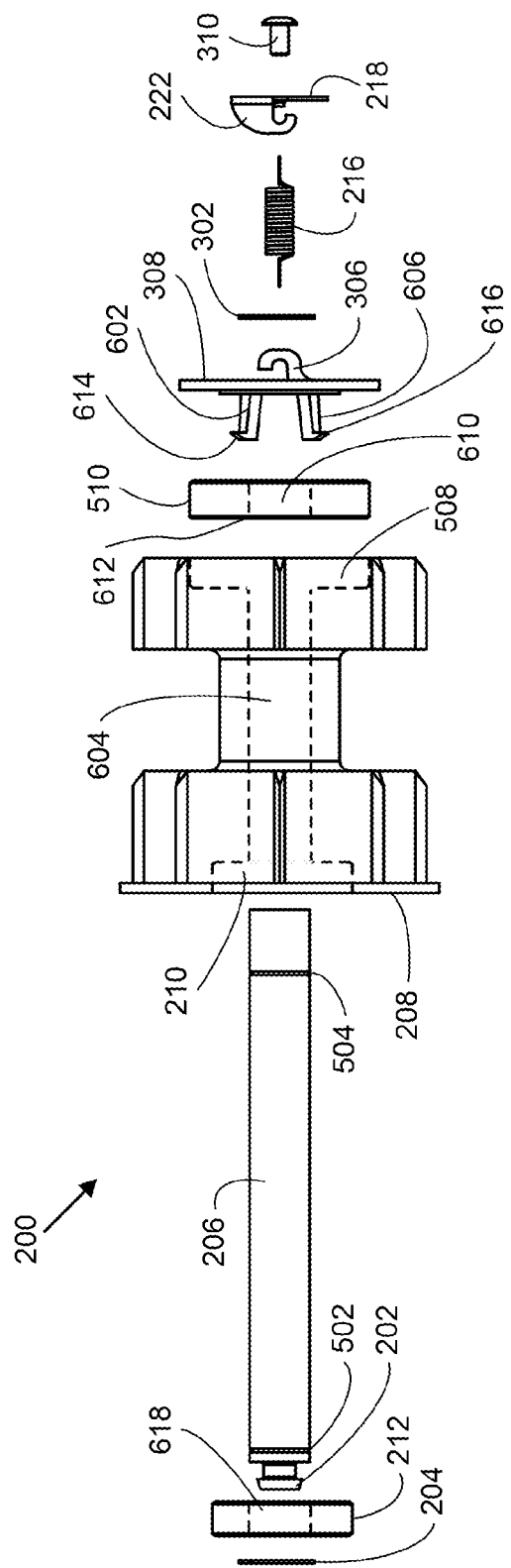
FIG. 6B an illustrative exploded orthographic side view of the gudgeon assembly of FIG. 6A rotated 90 degrees.
Figure 7A:
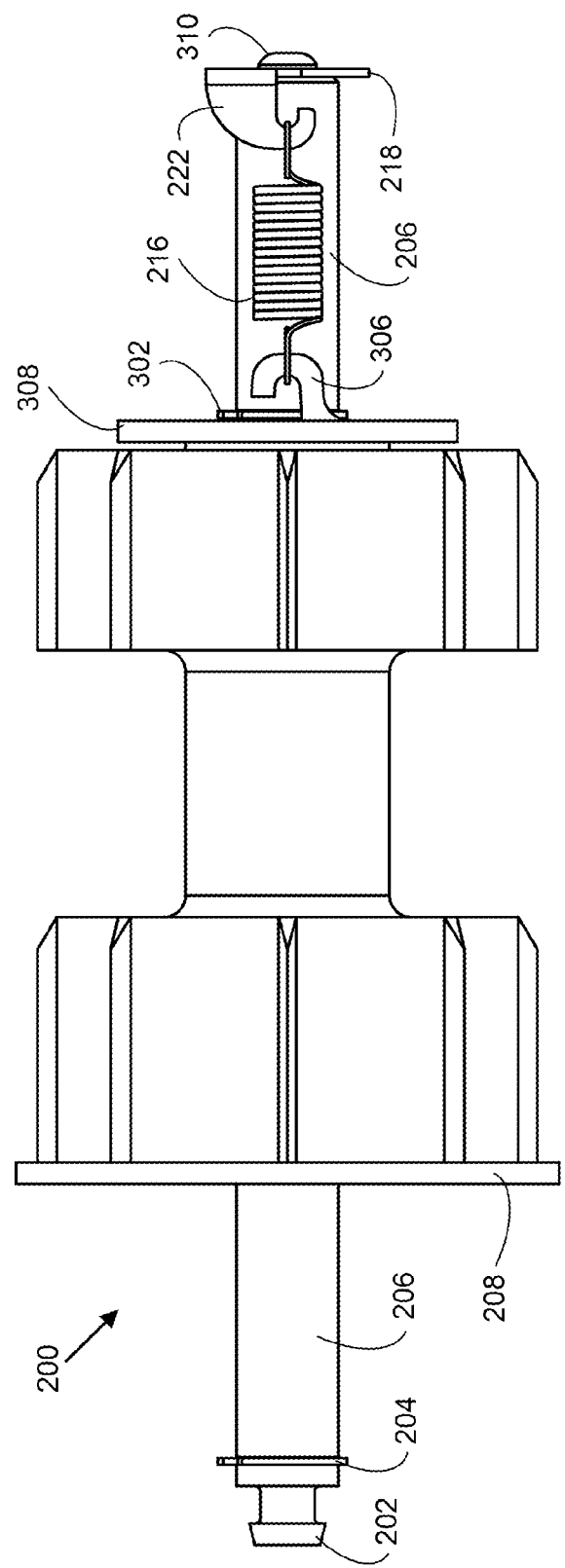
FIG. 7A is an illustrative orthographic side view of the gudgeon assembly of FIG. 4A rotated 90 degrees, according to one embodiment of the invention.
Figure 7B:
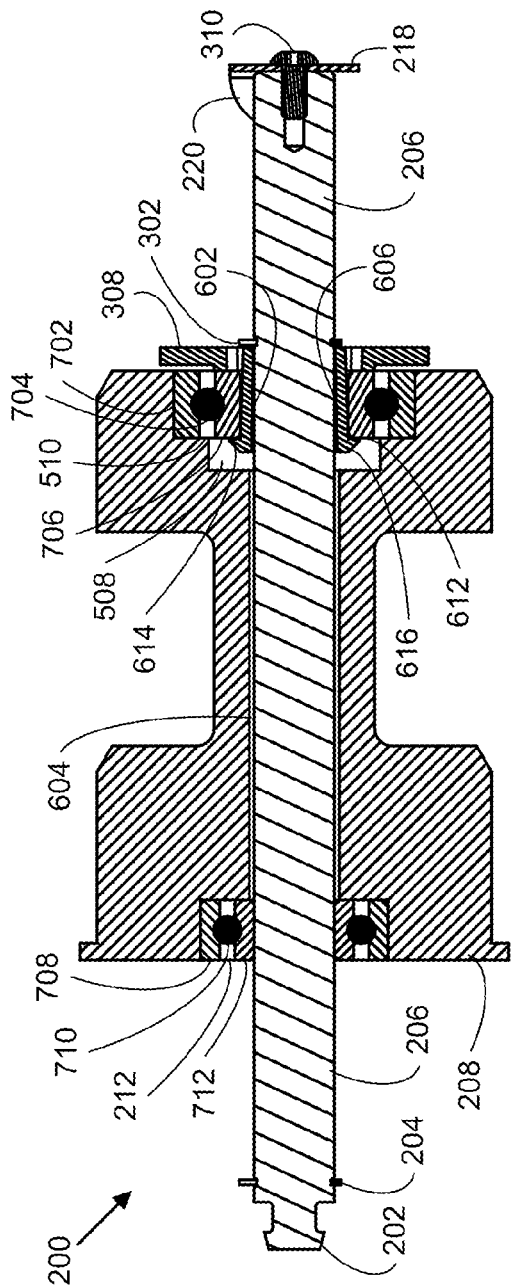
FIG. 7B is an illustrative cross-sectional side view of the gudgeon assembly of FIG. 7A, according to one embodiment of the invention.

Referring to FIGS. 6B, 7A, and 7B, the coupling of the large ball bearing 510 and the second spring plate 308 is described in further detail. The small ball bearing 212 includes an outer race 708, an inner race 712, and a plurality of balls 710 disposed therebetween. The inner race 712 of the small ball bearing 212 radially supports the proximal portion 226 of the gudgeon pin 206. The large ball bearing 510 includes an outer race 702, an inner race 706, and a plurality of balls 704 disposed therebetween. The outer races 702 and 708 are coupled to the gudgeon body 208 (e.g., via friction fit or other means). In other words, the gudgeon body rotates via the outer races 702 and 708.

As discussed above, the retention member 602 and retention member 606 are disposed into the opening 610. The flange 614 and the flange 616 contact a surface 612 on the inner race 706 and thereby secure the second spring plate 308 to the inner race 706. In other words, the second spring plate 308 is coaxial with and rotates via the inner race 706. Consequently, the second spring plate 308 and the gudgeon body 208 rotate independently of each other. Further, because the second spring plate 308 and the gudgeon body 208 rotate independently of each other, it follows that one of the second spring plate 308 and the gudgeon body 208 can remain stationary while the other of the second spring plate 308 and the gudgeon body 208 rotate.

Also as discussed above, the first spring plate 218, the second spring plate 308, and the gudgeon pin 206 are prevented from rotating with respect to each other because the first alignment tab 228 and the second alignment tab 512 are disposed in the tab channel 224 of the gudgeon pin 206. Therefore, the first spring plate 218, the second spring plate 308, and the gudgeon pin 206 rotate (via the inner race 706) together (as a single unit about the same longitudinal axis) independently of the gudgeon body 208. Likewise, the first spring plate 218, the second spring plate 308, and the gudgeon pin 206 can remain stationary as single unit while the gudgeon body 208 rotates.

Figure 4A:
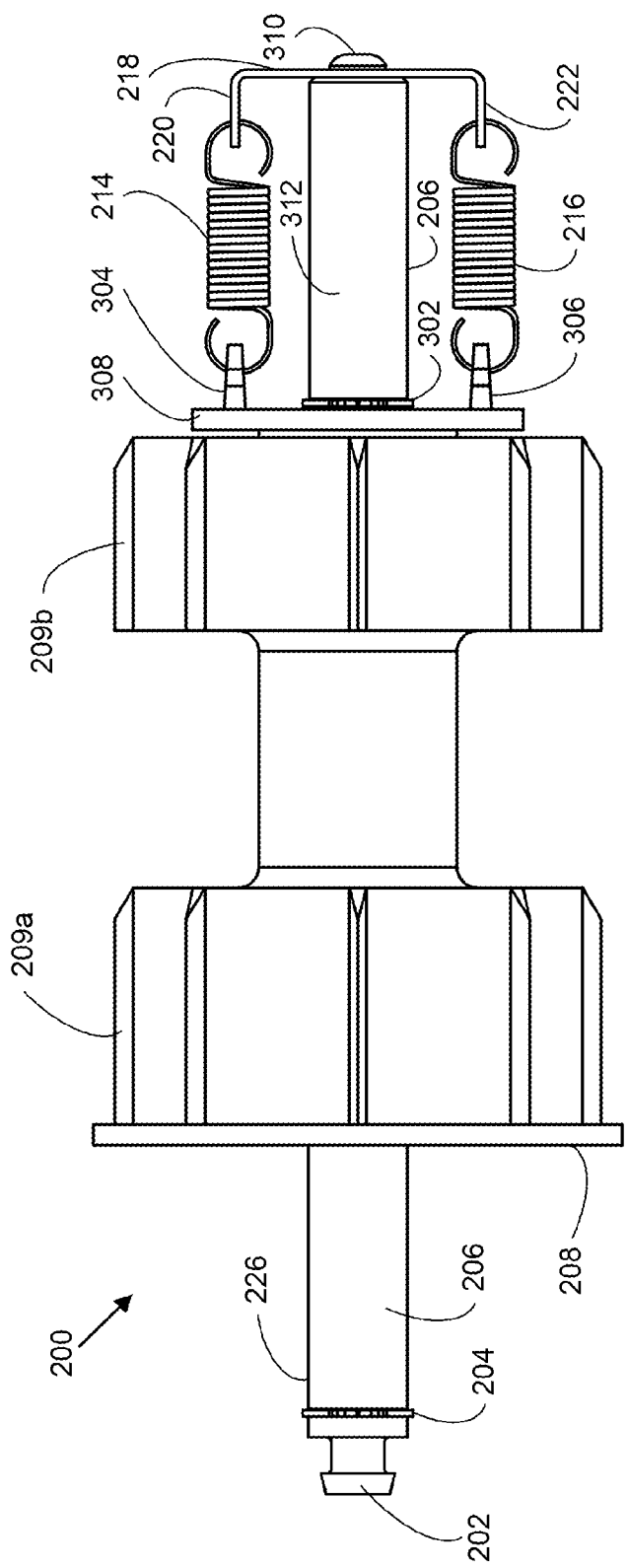
FIG. 4A is an illustrative orthographic side view of a gudgeon assembly with gudgeon springs in a relaxed state, according to one embodiment of the invention.
Figure 4B:
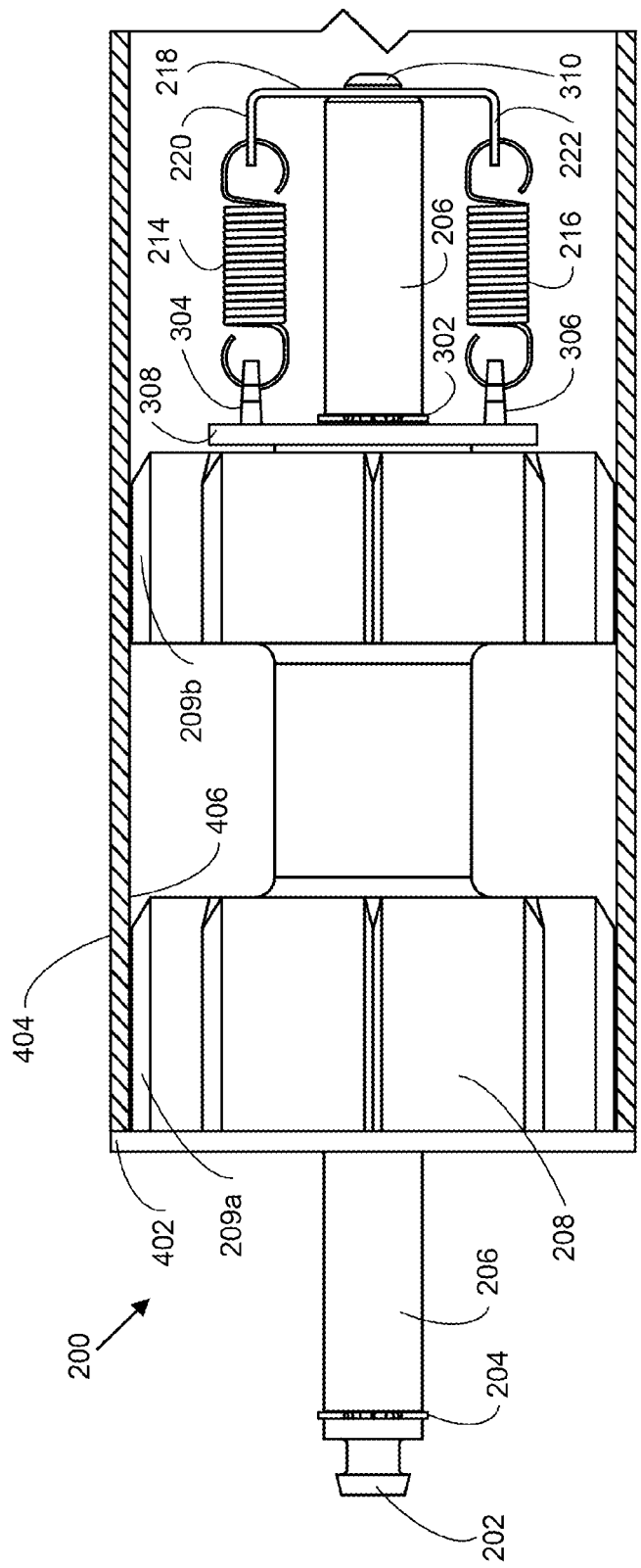
FIG. 4B is an illustrative cross-sectional side view of a roller tube with the gudgeon assembly of FIG. 4A partially disposed therein, according to one embodiment of the invention.
Figure 5:
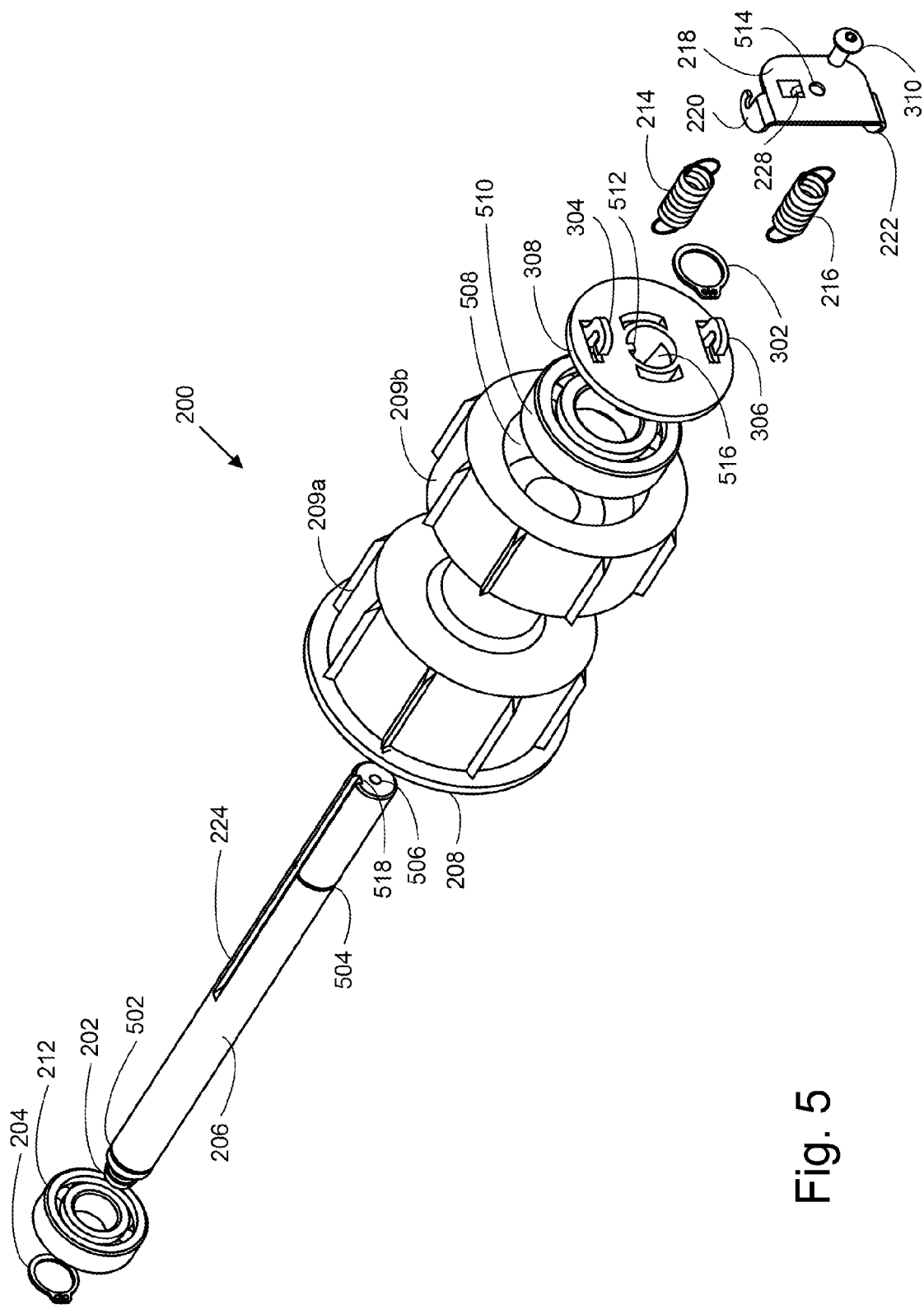
FIG. 5 is an illustrative exploded isometric rear view of a gudgeon assembly, according to one embodiment of the invention.
Figure 11:
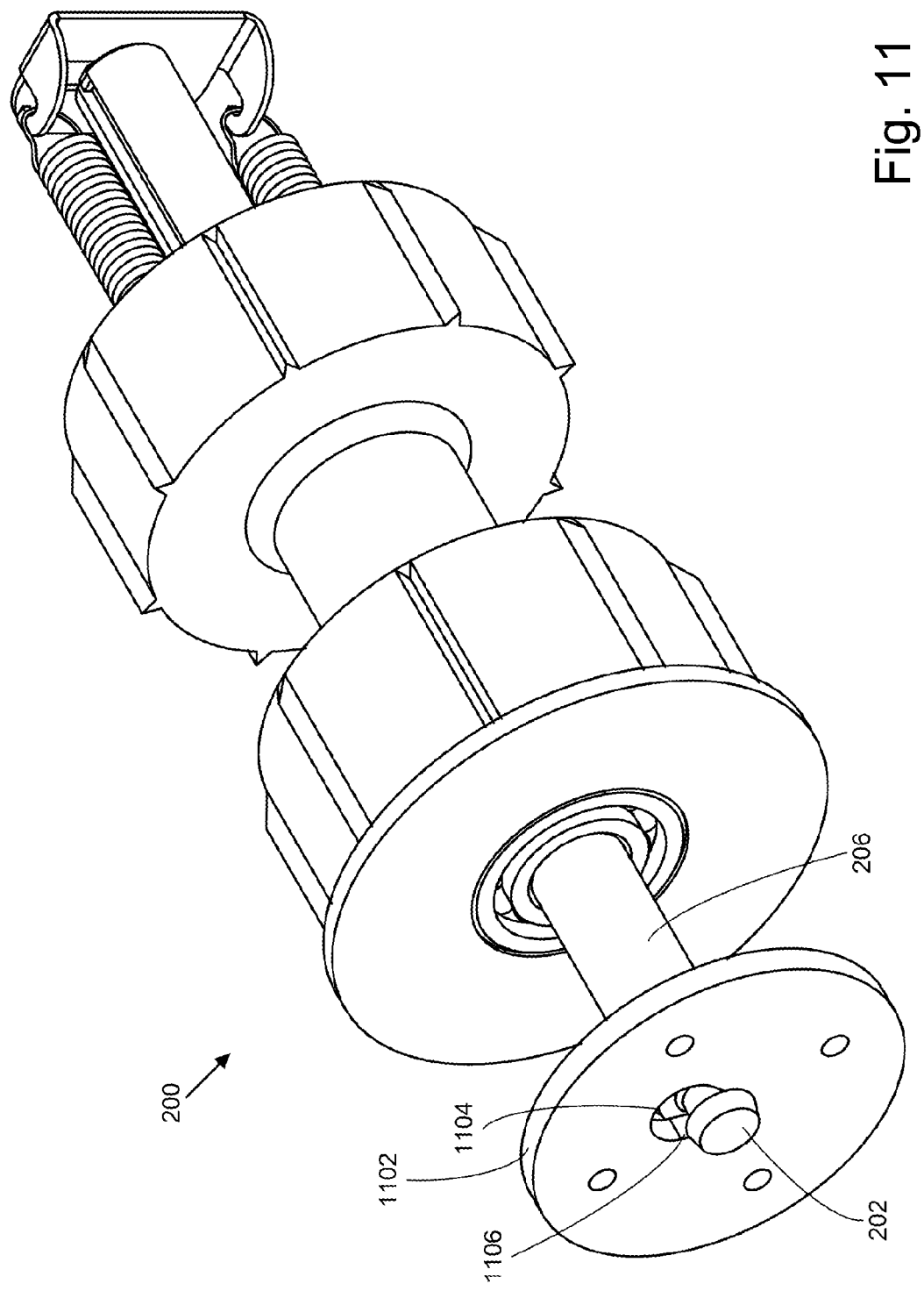
FIG. 11 is an illustrative isometric front view of the gudgeon assembly of FIG. 2 with an attached gudgeon pin plate, according to one embodiment of the invention.
Figure 12:
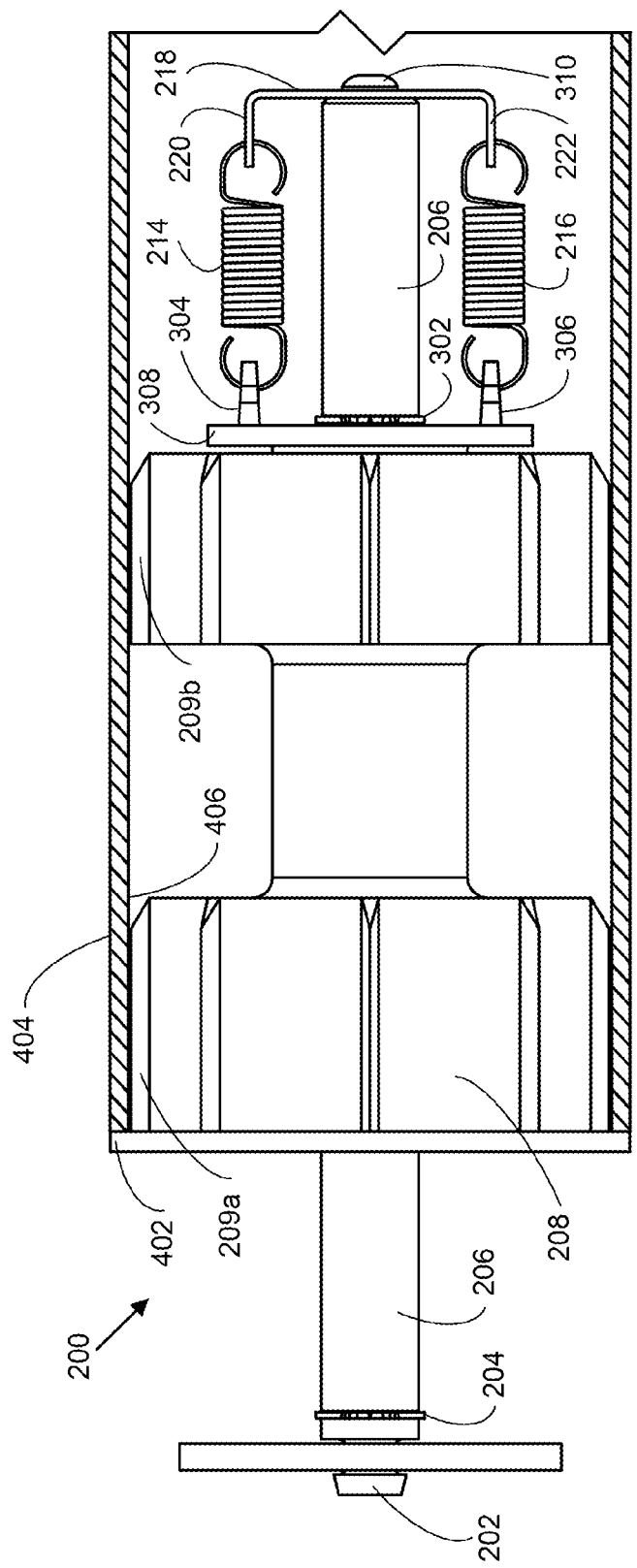
FIG. 12 is an illustrative cross-sectional side view of a roller tube with the gudgeon assembly of FIG. 4A partially disposed therein with a gudgeon plate attached thereto, according to one embodiment of the invention

Referring to FIGS. 4A and 4B, the first extension spring 214 and the second extension spring 216 are in a relaxed state. In this relaxed state, the first spring plate 218 is pulled (by extension springs 214 and 216) toward the second spring plate 308 until the second movement limit clip 302 contacts the second spring plate 308 and the proximal portion 226 of the gudgeon pin 206 extends out of the gudgeon body 208 a predetermined maximum distance. This predetermined maximum distance is enough to allow the gudgeon pin tip 202 to couple to a gudgeon pin plate 1102 (see FIGS. 11 and 12) when the roller shade roller tube 404 is mounted over a window.

Figure 8:
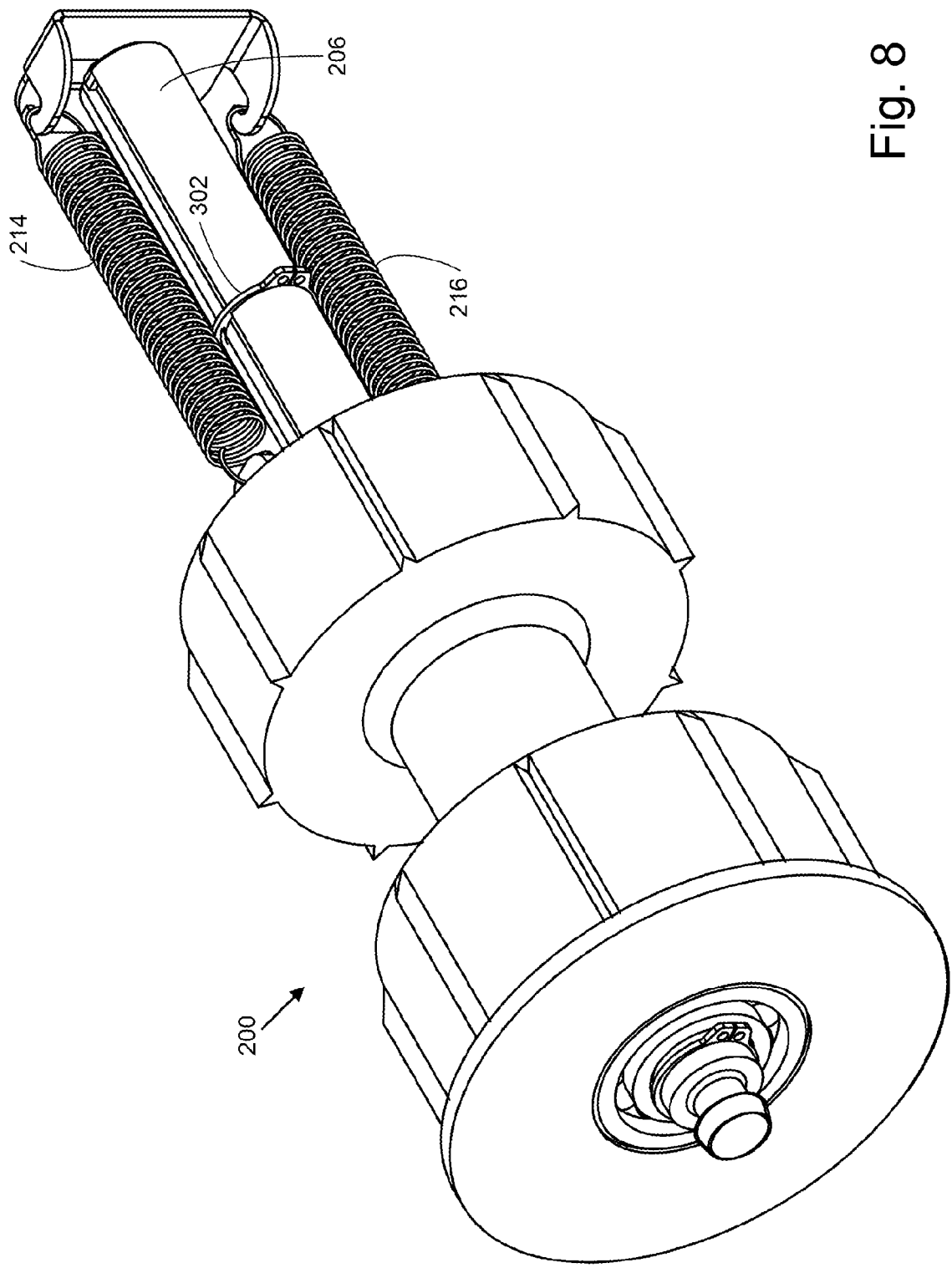
FIG. 8 is an illustrative isometric front view of a gudgeon assembly with gudgeon springs in a extended state, according to one embodiment of the invention.
Figure 9:
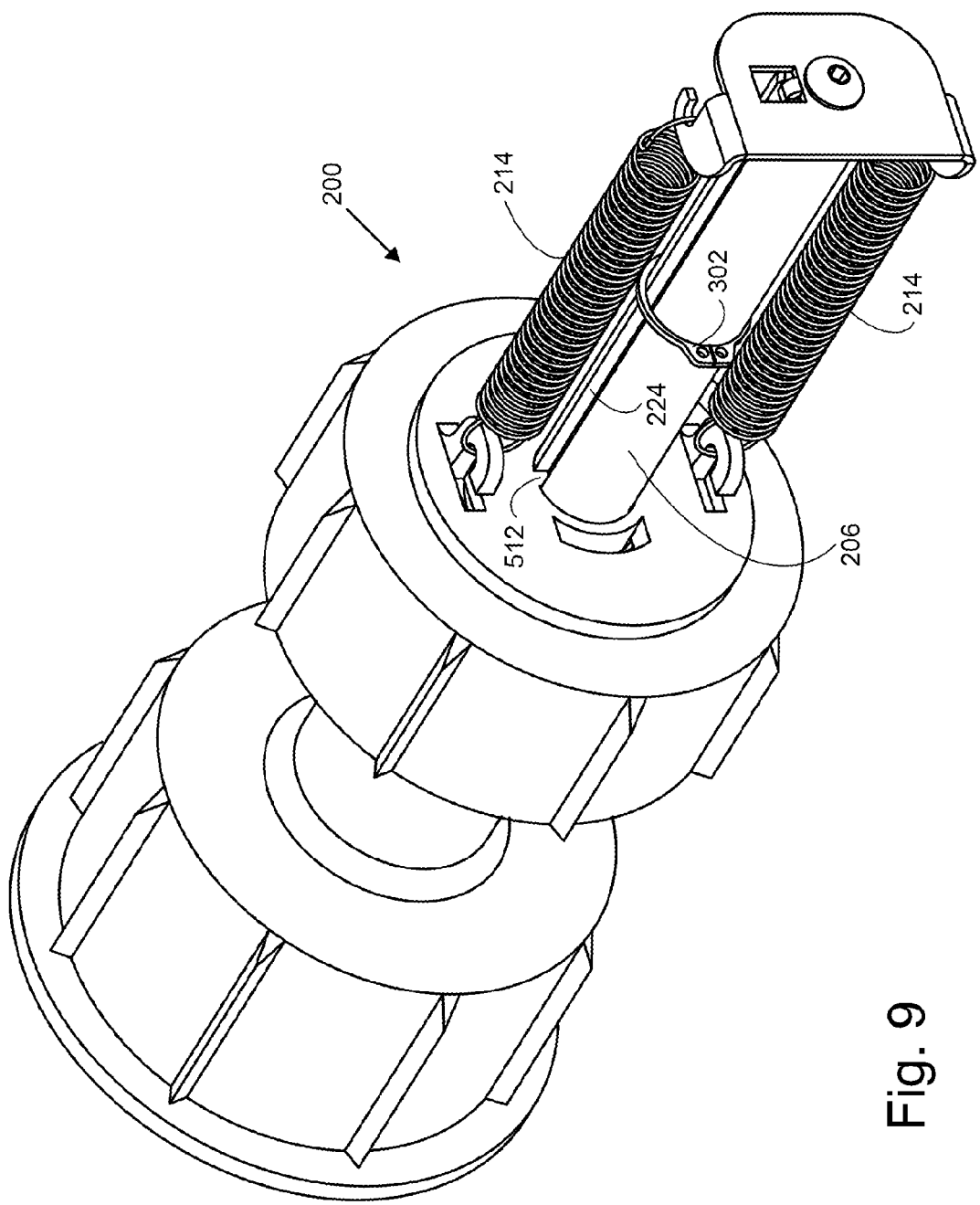
FIG. 9 is an illustrative isometric rear view of a gudgeon assembly with gudgeon springs in a extended state, according to one embodiment of the invention.
Figure 10:
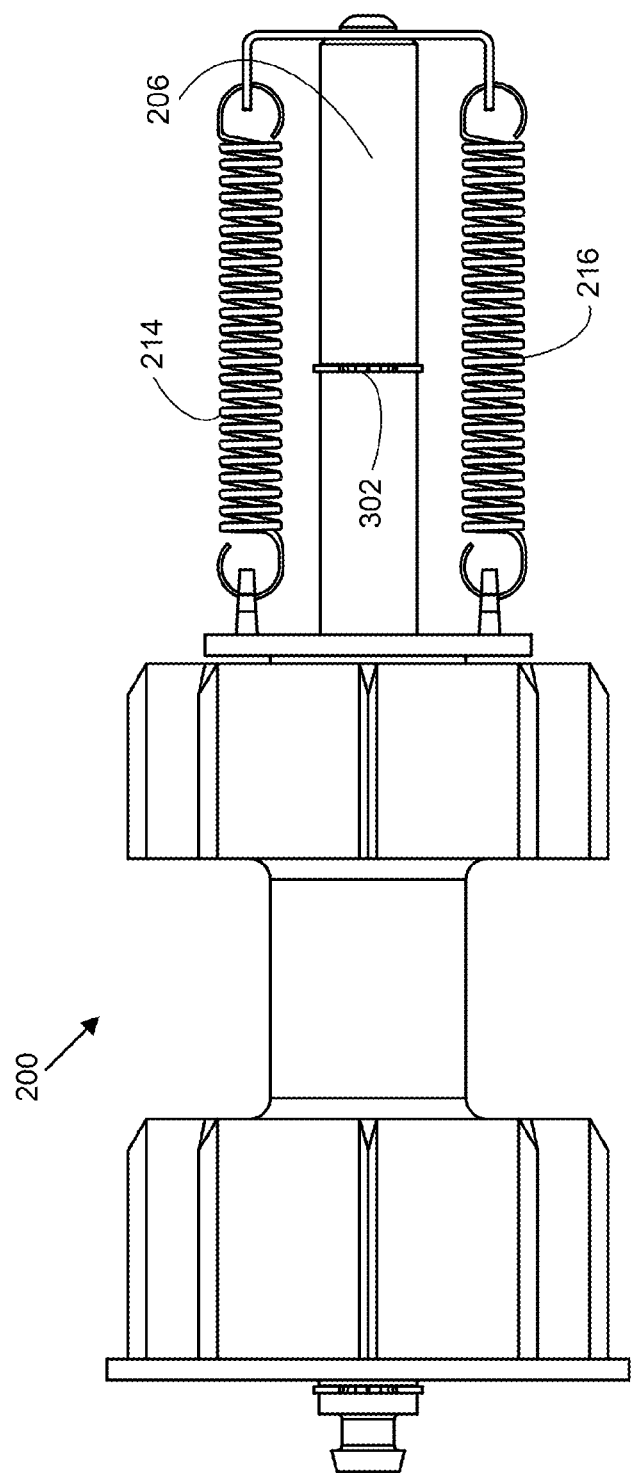
FIG. 10 is an illustrative orthographic side view of a gudgeon assembly with gudgeon springs in a extended state, according to one embodiment of the invention.

Referring to FIGS. 8-10, various views of the gudgeon assembly 200 with the first extension spring 214 and the second extension spring 216 in extended states are shown. During the shade mounting process, when the gudgeon pin 206 is to be coupled to a matching gudgeon pin plate 1102 (see FIGS. 11 and 12), the gudgeon pin 206 is pushed into the gudgeon body 208 (along its longitudinal axis) to provide maneuvering room for aligning the gudgeon pin tip 202 with a mounting hole 1104 in the gudgeon pin plate 1102. It should be noted that the tab channel 224 is of sufficient length along the gudgeon pin 206 to allow full extension and recoil of the first extension spring 214 and the second extension spring 216 while maintaining rotational alignment of the first spring plate 218, the second spring plate 308, and the gudgeon pin 206.

When the proximal portion 226 of the gudgeon pin 206 is pushed (e.g., by an installation technician) into the gudgeon body 208 (and held in place), the distal portion 312 and the first spring plate 218 moves away from the gudgeon body 208, the second movement limit clip 302 moves away from the second spring plate 308, and the first and second extension springs 214, 216 consequently extend. The distance the proximal portion 226 moves into the gudgeon body 208 is determined by the location of the first movement limit clip 204 (see FIGS. 8 and 10).

After the gudgeon pin tip 202 is aligned with the gudgeon pin plate 1102, the gudgeon pin 206 is released and the first extension spring 214 and the second extension spring 216 return (recoil) to a relaxed state (see FIGS. 4A, 4B) and pull the first spring plate 218 toward the second spring plate 308. The distal portion 312 of the gudgeon pin 206 slides into the gudgeon body 208, the proximal portion 226 moves toward the gudgeon pin plate 1102, and the gudgeon pin tip 202 moves into the mounting hole 1104. The technician secures the gudgeon pin 206 by letting the gudgeon pin tip 202 drop into a narrow locking channel 1106.

During roller shade operation, the roller tube 404 and gudgeon body 208 rotate together via the outer race 708 of the small ball bearing 212 and outer race 702 of the large ball bearing 510 as the shade is raised or lowered. During the rotation of the gudgeon body 208, the gudgeon pin 206 is held stationary via the gudgeon pin tip 202 being held in the narrow locking channel 1106. Because the first alignment tab 228 and the second alignment tab 512 are each disposed in the tab channel 224 of the gudgeon pin 206, the first spring plate 218 and the second spring plate 308 are also held stationary. In other words, the gudgeon pin 206, the first spring plate 218, and the second spring plate 308 do not rotate when the roller shade is raised or lowered.

Those skilled in the art will recognize two significant benefits of the above-described gudgeon assembly. First, the axial separation of the first and second extension springs 214, 216 and the gudgeon pin 206 prevent the first and second extension springs 214, 216 and the gudgeon pin 206 from contacting each other and rubbing/grinding together and creating undesirable noise. Second, the rotational separation of the spring plate 218, the spring plate 308, and the gudgeon pin 206 from the gudgeon body 208 and roller tube 404 prevent the first and second extension springs 214, 216 from twisting during shade operation.

In another embodiment, either the first extension spring 214 or the second extension spring 216 can be removed from the gudgeon assembly 200 as long as the remaining spring provides enough recoil force to pull the first spring plate 218 towards the second spring plate 308.

In yet another embodiment, three or four springs are included in the disclosed gudgeon assembly. Specifically, the additional one or two springs are non-coaxial with the gudgeon pin 206 and are disposed in a plane perpendicular to the plane in which the first and second extension springs 214, 216 are disposed.

In still another embodiment, the gudgeon assembly includes one gudgeon spring coaxial with the gudgeon pin. However, the single gudgeon spring has an inner diameter greater than the gudgeon pin and the second movement limit clip so that the gudgeon pin and the second movement limit clip can move longitudinally inside the single gudgeon spring during shade installation. Further, the single gudgeon spring, being coupled to the first and second spring plates, rotates together with the gudgeon pin, the first spring plate, and the second spring plate, and thus does not twist, or rub against gudgeon pin.

In yet another embodiment, the second spring plate attaches directly to an outer/side surface of the inner race of the large ball bearing that is facing the second spring plate. This is accomplished through welding or adhering of the second spring plate (without retention members) to the outer/side surface. This alternative second spring plate also includes an alignment tab to key it's rotational motion to the gudgeon pin. In this embodiment, there is no need for two different size ball bearings since clearance for the retention members is not necessary.

ALTERNATE EMBODIMENTS

Variations, modifications, and other implementations of what is described herein may occur to those of ordinary skill in the art without departing from the spirit and scope of the invention. Accordingly, the invention is not to be defined only by the preceding illustrative description.

What is claimed is:

1. A roller shade gudgeon assembly comprising:
    a gudgeon body;
    a gudgeon pin coaxial with and extending through the gudgeon body, the gudgeon pin being movable along and rotationally about its longitudinal axis;
    a first spring plate coupled to an end of the gudgeon pin;
    a second spring plate defining an opening, the opening being coaxial with the gudgeon pin, the gudgeon pin being partially disposed in the opening and movable along its longitudinal axis within the opening; and
    a gudgeon spring coupled to the first spring plate and the second spring plate, a longitudinal axis of the gudgeon spring being coplanar and non-coaxial with the longitudinal axis of the gudgeon pin, the gudgeon spring pulling the first spring plate toward the second spring plate.

2. The gudgeon assembly of claim 1, wherein the gudgeon body defines a cylindrical passage, a first cavity, and a second cavity.

3. The gudgeon assembly of claim 2, further comprising a first ball bearing disposed in the first cavity and a second ball bearing disposed in the second cavity.

4. The gudgeon assembly of claim 3, wherein the gudgeon pin defines a channel.

5. The gudgeon assembly of claim 4, wherein the second ball bearing comprises an inner race and an outer race, and wherein the second spring plate is coupled to the inner race and the gudgeon body is coupled to the outer race thereby allowing the second spring plate and gudgeon body to rotate independently of each other.

6. The gudgeon assembly of claim 5, wherein the first spring plate further comprises a first tab, the first tab being at least partially disposed in the channel and thereby preventing rotational movement of the gudgeon pin and first spring plate relative to each other.

7. The gudgeon assembly of claim 6, wherein the second spring plate comprises a second tab, the second tab being at least partially disposed in the channel thereby aligning the second spring plate and the first spring plate and preventing rotational movement of the gudgeon pin and the first spring plate relative to the second spring plate.

8. The gudgeon assembly of claim 2, further comprising a first clip coupled to the a proximal portion of the gudgeon pin, the first clip limiting movement of the proximal portion into the cylindrical passage.

9. The gudgeon assembly of claim 2, further comprising a second clip coupled to a distal portion of the gudgeon pin, the second clip limiting movement of the distal portion into the cylindrical passage.

10. A gudgeon assembly for use with a roller shade roller tube, the gudgeon assembly comprising:
    a gudgeon body defining a cylindrical passage, a first cavity, and a second cavity;
    a first ball bearing disposed in the first cavity;
    a second ball bearing disposed in the second cavity;
    a gudgeon pin comprising a proximal portion and a distal portion, the gudgeon pin being partially disposed in the cylindrical passage and extending through the gudgeon body, the gudgeon pin being coaxial with the first ball bearing and the second ball bearing;
    a first spring plate coupled to the distal portion of the gudgeon pin;
    a second spring plate defining an opening and being coupled to the second ball bearing, the opening being coaxial with the second ball bearing and the gudgeon pin, the gudgeon pin being partially disposed in the opening and movable along its longitudinal axis within the cylindrical passage and the opening;

a first gudgeon spring coupled to the first spring plate and the second spring plate, a longitudinal axis of the first gudgeon spring being coplanar and non-coaxial with a longitudinal axis of the gudgeon pin; and a second gudgeon spring coupled to the first spring plate and the second spring plate, a longitudinal axis of the second gudgeon spring being coplanar and non-coaxial with the longitudinal axis of the gudgeon pin and the longitudinal axis of the first gudgeon spring, the first and second gudgeon springs pulling the first gudgeon plate toward the second gudgeon plate.

11. The gudgeon assembly of claim 10, further comprising a first clip coupled to the proximal portion of the gudgeon pin, the first clip limiting movement of the proximal portion into the cylindrical passage.

12. The gudgeon assembly of claim 11, further comprising a second clip coupled to the distal portion of the gudgeon pin, the second clip limiting movement of the distal portion into the cylindrical passage.

13. The gudgeon assembly of claim 10, wherein the gudgeon pin defines a channel.

14. The gudgeon assembly of claim 13, wherein the second ball bearing comprises an inner race, an outer race, and a plurality of balls disposed between the inner race and outer race, and wherein the second spring plate is coupled to the inner race and the gudgeon body is coupled to the outer race thereby allowing the second spring plate and gudgeon body to rotate independently of each other.

15. The gudgeon assembly of claim 14, wherein the first spring plate further comprises a first tab, the first tab being at least partially disposed in the channel and thereby preventing rotational movement of the gudgeon pin and first spring plate relative to each other.

16. The gudgeon assembly of claim 15, wherein the second spring plate comprises a second tab, the second tab being at least partially disposed in the channel thereby aligning the second spring plate and the first spring plate and preventing rotational movement of the gudgeon pin and the first spring plate relative to the second spring plate.

17. A roller shade comprising:
a roller tube; and
a gudgeon assembly partially disposed in the roller tube, the gudgeon assembly comprising:
a gudgeon body defining a cylindrical passage, a first cavity, and a second cavity;
a first ball bearing disposed in the first cavity;
a second ball bearing disposed in the second cavity;
a gudgeon pin defining a channel and comprising a proximal portion and a distal portion, the gudgeon pin being partially disposed in the cylindrical passage and extending through the gudgeon body, the gudgeon pin being coaxial with the first ball bearing and the second ball bearing;
a first spring plate coupled to the distal portion of the gudgeon pin;
a second spring plate defining an opening and being coupled to the second ball bearing, the opening being coaxial with the second ball bearing and the gudgeon pin, the gudgeon pin being partially disposed in the opening and movable along its longitudinal axis within the cylindrical passage and the opening;
a first gudgeon spring coupled to the first spring plate and the second spring plate, a longitudinal axis of the first gudgeon spring being coplanar and non-coaxial with a longitudinal axis of the gudgeon pin; and
a second gudgeon spring coupled to the first spring plate and the second spring plate, a longitudinal axis of the second gudgeon spring being coplanar and non-coaxial with the longitudinal axis of the gudgeon pin and the longitudinal axis of the first gudgeon spring, the first and second gudgeon springs pulling the first gudgeon plate toward the second gudgeon plate.

18. The roller shade of claim 17, wherein the second ball bearing comprises an inner race, an outer race, and a plurality of balls disposed between the inner race and outer race, and wherein the second spring plate is coupled to the inner race and the gudgeon body is coupled to the outer race thereby allowing the second spring plate and gudgeon body to rotate independently of each other.

19. The roller shade of claim 18, wherein the first spring plate further comprises a first tab, the first tab being at least partially disposed in the channel and thereby preventing rotational movement of the gudgeon pin and first spring plate relative to each other.

20. The roller shade of claim 19, wherein the second spring plate comprises a second tab, the second tab being at least partially disposed in the channel thereby preventing rotational movement of the gudgeon pin and the first spring plate relative to the second spring plate.

21. The roller shade of claim 17, wherein the gudgeon assembly further comprises a first clip coupled to the proximal portion of the gudgeon pin, the first clip limiting movement of the proximal portion into the cylindrical passage.

22. The roller shade of claim 18, wherein the gudgeon assembly further comprises a second clip coupled to the distal portion of the gudgeon pin, the second clip limiting movement of the distal portion into the cylindrical passage.

* * * * *